(12) United States Patent
Kikuchi

(10) Patent No.: US 10,913,355 B2
(45) Date of Patent: Feb. 9, 2021

(54) HEAD-UP DISPLAY

(71) Applicant: NIPPON SEIKI CO., LTD., Niigata (JP)

(72) Inventor: Yuta Kikuchi, Niigata (JP)

(73) Assignee: NIPPON SEIKI CO., LTD., Tokyo (JP)

( * ) Notice: Subject to any disclaimer, the term of this patent is extended or adjusted under 35 U.S.C. 154(b) by 202 days.

(21) Appl. No.: 16/305,336

(22) PCT Filed: Jun. 22, 2017

(86) PCT No.: PCT/JP2017/022981
§ 371 (c)(1),
(2) Date: Nov. 28, 2018

(87) PCT Pub. No.: WO2018/003650
PCT Pub. Date: Jan. 4, 2018

(65) Prior Publication Data
US 2020/0317053 A1    Oct. 8, 2020

(30) Foreign Application Priority Data

Jun. 29, 2016  (JP) ................................. 2016-128247

(51) Int. Cl.
*G09G 5/377* (2006.01)
*B60K 35/00* (2006.01)
*G09G 5/14* (2006.01)

(52) U.S. Cl.
CPC ............... *B60K 35/00* (2013.01); *G09G 5/14* (2013.01); *G09G 5/377* (2013.01);
(Continued)

(58) Field of Classification Search
CPC ................... G09G 5/377; G09G 5/397; G09G 2320/0613; G09G 2320/0686;
(Continued)

(56) References Cited

U.S. PATENT DOCUMENTS

2002/0044152 A1*  4/2002  Abbott, III ............ G06T 19/006
                                                          345/629
2010/0157430 A1*  6/2010  Hotta ..................... G02B 27/01
                                                          359/630
(Continued)

FOREIGN PATENT DOCUMENTS

EP       2 724 751 A1    4/2014
JP       2001-171390 A   6/2001
(Continued)

OTHER PUBLICATIONS

International Search Report issued in corresponding International Patent Application No. PCT/JP2017/022981, dated Sep. 19, 2017, with English Translation.

*Primary Examiner* — Antonio A Caschera
(74) *Attorney, Agent, or Firm* — McDermott Will & Emery LLP

(57) ABSTRACT

Aspects of the subject technology relate to a head-up display that achieves a balance in visibility between a virtual image and foreground displayed on each of a plurality of virtual display surfaces for virtual images. A first virtual image display surface and a second virtual image display surface are generated at different positions in the depth direction from the perspective of a viewer, and the ratio between the visibility level of a first virtual image displayed on the first virtual image display surface and the visibility level of a second virtual image displayed on the second virtual image display surface is gradually altered (increased or decreased) according to prescribed parameter information which is presented as numerical values or in multiple levels.

6 Claims, 5 Drawing Sheets

(52) U.S. Cl.
CPC .. *B60K 2370/12* (2019.05); *B60K 2370/1529* (2019.05); *B60K 2370/349* (2019.05); *G09G 2320/0613* (2013.01); *G09G 2320/0686* (2013.01); *G09G 2320/08* (2013.01); *G09G 2340/12* (2013.01); *G09G 2360/144* (2013.01); *G09G 2380/10* (2013.01)

(58) Field of Classification Search
CPC .. G09G 2380/10; G09G 5/14; G09G 2320/08; G09G 2340/12; G09G 2360/144; G02B 27/01; G02B 2027/0141; B60K 2370/1529; B60K 35/00; B60K 2370/379; B60K 2370/12
See application file for complete search history.

(56) References Cited

U.S. PATENT DOCUMENTS

| | | | |
|---|---|---|---|
| 2012/0050138 A1* | 3/2012 | Sato | G02B 27/017 345/4 |
| 2016/0159280 A1 | 6/2016 | Takazawa et al. | |
| 2016/0167514 A1* | 6/2016 | Nishizaki | G02B 27/01 345/7 |
| 2016/0216521 A1 | 7/2016 | Yachida et al. | |

FOREIGN PATENT DOCUMENTS

| | | |
|---|---|---|
| JP | 2008-257021 A | 10/2008 |
| JP | 2015-011666 A | 1/2015 |
| JP | 2015-101311 A | 6/2015 |
| WO | 2012/176288 A1 | 12/2012 |

\* cited by examiner

[FIG. 1]
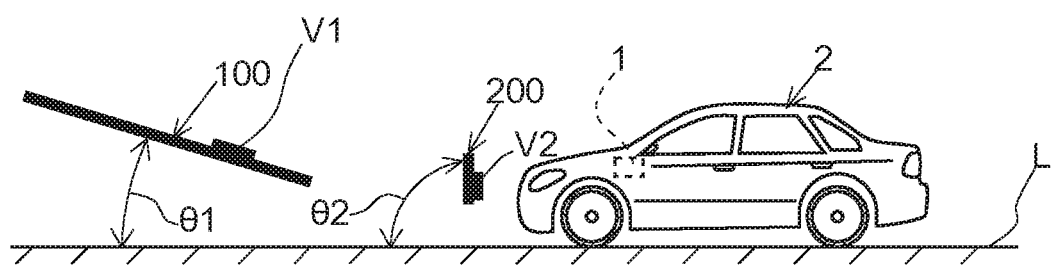
[FIG. 2]
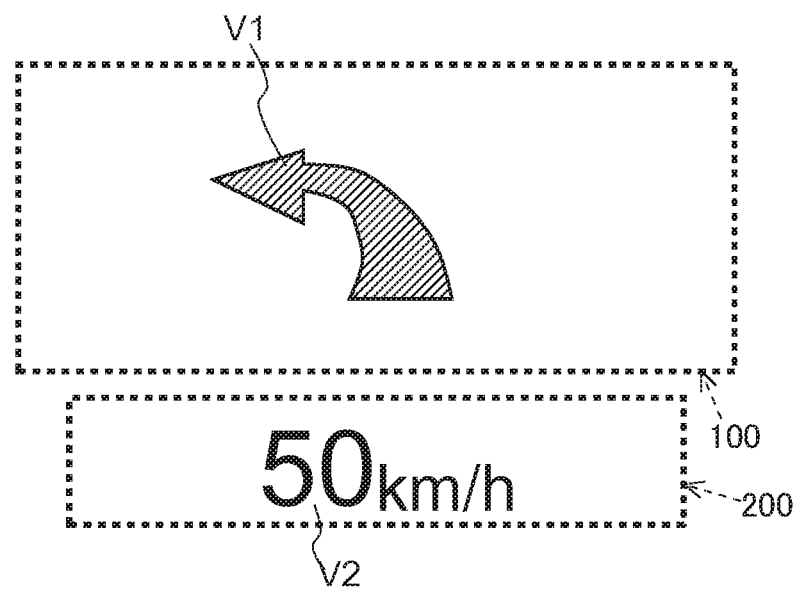

[FIG. 3]
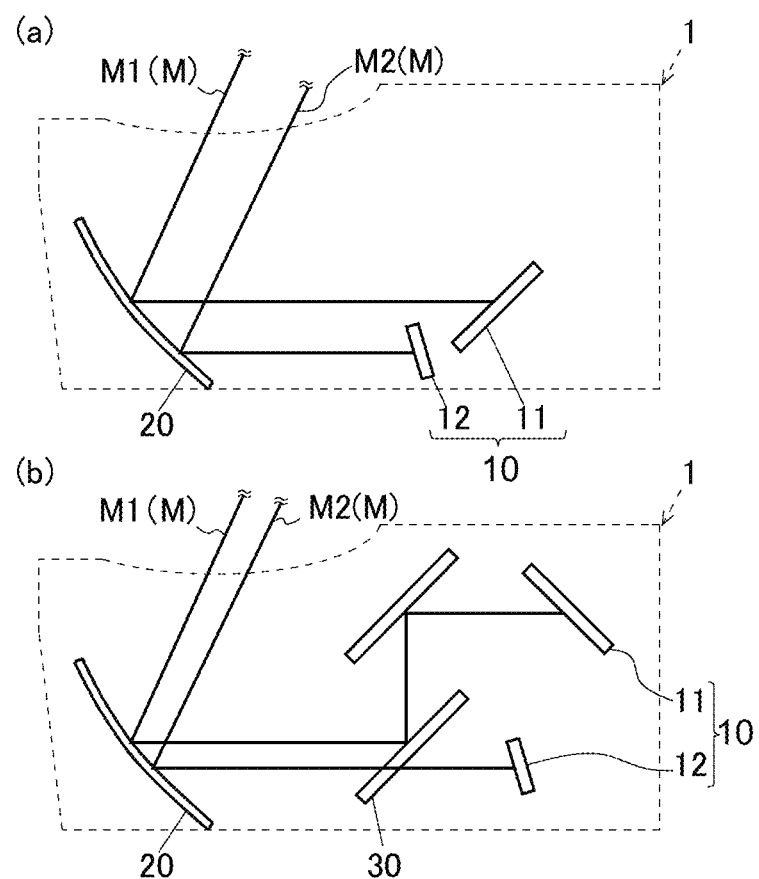

[FIG. 4]
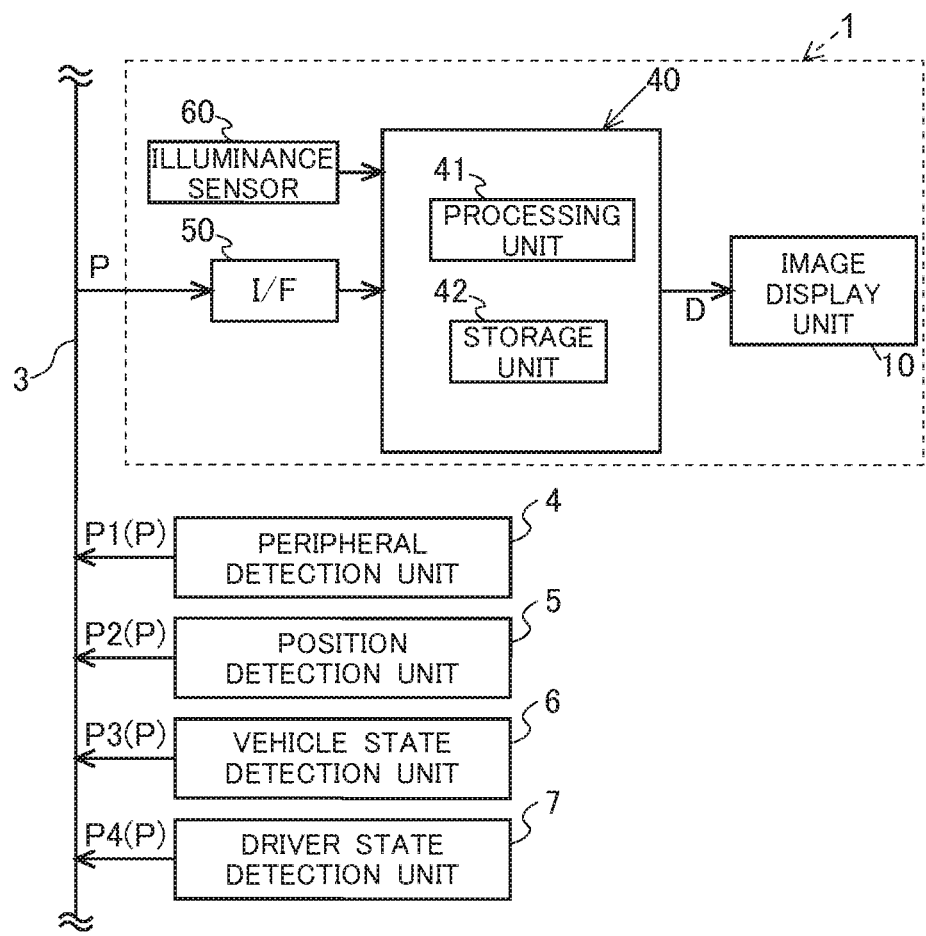

[FIG. 5]
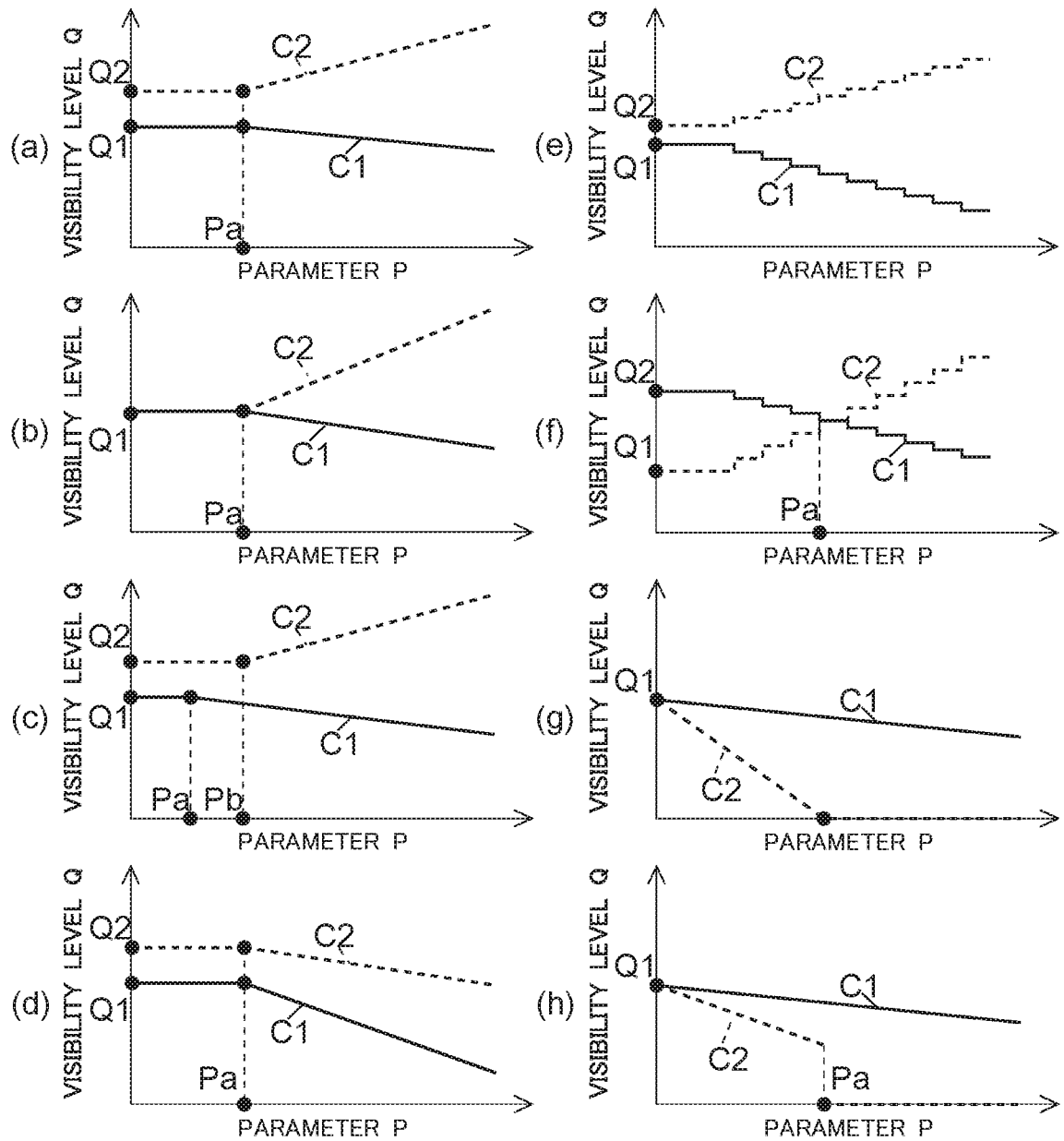

[FIG. 6]
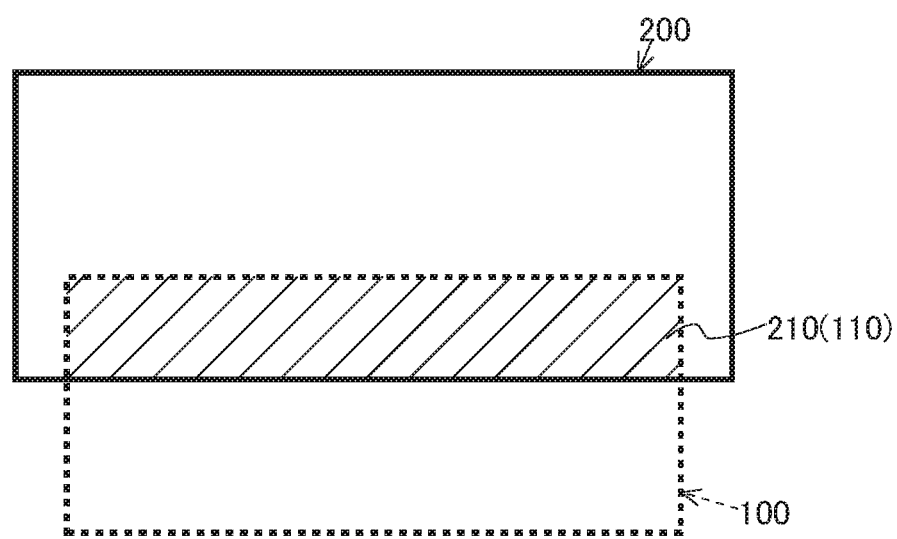

HEAD-UP DISPLAY

CROSS REFERENCE

This application is the U.S. National Phase under 35 U.S.C. § 371 of International Application No. PCT/JP2017/022981, filed on Jun. 22, 2017, which claims the benefit of Japanese Application. No. 2016-128247, filed on Jun. 29, 2016, the entire contents of each are hereby incorporated by reference.

TECHNICAL FIELD

The present invention relates to a head-up display capable of generating a plurality of virtual image display surfaces.

BACKGROUND ART

A head-up display disclosed in Patent Document 1 generates a plurality of imaginary virtual image display surfaces capable of displaying a virtual image. This head-up display is configured to display a virtual image on each of a plurality of virtual image display surfaces to provide a stereoscopic display.

Further, if a driver receives an incoming call on a mobile phone while driving a vehicle, a head-up display disclosed in Patent Document 2 gradually decreases a visibility of information about the vehicle, and gradually increases a visibility of information about the incoming call.

PRIOR ART DOCUMENT

Patent Document

Patent Document 1: Japanese Unexamined Patent Application Publication No. 2008-257021
Patent Document 2: Japanese Unexamined Patent Application Publication No. 2001-171390

SUMMARY OF THE INVENTION

Technical Problem

However, the head-up display described in Patent Document 1 includes a plurality of virtual image display surfaces, and thus, a region for displaying the virtual image is wider and a line of sight and attention of a viewer are distracted. As a result, there arises a problem that it is difficult to make the viewer recognize the display, even if a specific display should attract more the attention of the viewer.

Further, the head-up display in Patent Document 2 timely increases a visibility of necessary information, and thus, awareness of the viewer can be directed to the specific display. However, the awareness is directed to the specific display in the extreme, and thus the awareness for another display and for a foreground of a vehicle may decrease too much.

A first object of the present invention is to provide a head-up display capable of achieving a balance in visibility between each of a plurality of generated displays and a foreground.

Solution to Problem

To solve the above-described problems, the present invention adopts the following means.

As a gist of the present invention, a head-up display thereof achieves a balance in visibility between each of a plurality of displays and a foreground (actual view) by gradually changing (increasing or decreasing) a relative ratio between a visibility level of a first virtual image displayed on a first virtual image display surface and a visibility level of a second virtual image displayed on a second virtual image display surface, in accordance with predetermined parameter information indicated as a numerical value or a plurality of graded levels.

The head-up display according to the present invention is configured to display a first virtual image on a first virtual image display surface and display a second virtual image on a second virtual image display surface generated more closely to a viewer than the first virtual image display surface. The head-up display includes: a parameter information acquisition means configured to acquire predetermined parameter information indicated as a numerical value or a plurality of graded levels; and a display control unit configured to control a display of the first virtual image and the second virtual image. The display control unit changes continuously or stepwise the visibility of the first virtual image and the visibility of the second virtual image, in accordance with the numerical value or the level of the parameter information acquired by the parameter information acquisition means. A changing rate of the visibility of the first virtual image for the parameter information is different from a changing rate of the visibility of the second virtual image.

Advantageous Effects of Invention

It is possible to achieve a balance in visibility between each of a plurality of generated displays and a foreground.

BRIEF DESCRIPTION OF THE DRAWINGS

FIG. 1 is a diagram illustrating a first virtual image display surface and a second virtual image display surface generated by a head-up display of an embodiment of the present invention.

FIG. 2 is a diagram for describing an arrangement of the first virtual image display surface and the second virtual image display surface generated by the head-up display of the embodiment when a viewer views the front.

FIG. 3(*a*) and FIG. 3(*b*) are schematic diagrams illustrating an example of a configuration of the head-up display of the embodiment.

FIG. 4 is a diagram illustrating an electrical configuration of a head-up display of the embodiment.

FIG. 5(*a*) to FIG. 5 (*h*) are graphs for describing a relationship between first visibility control data C1 and second visibility control data C2 of the embodiment.

FIG. 6 is a diagram for describing a modification of the arrangement of the first virtual image display surface and the second virtual image display surface generated by the head-up display of the embodiment when a viewer views the front.

DESCRIPTION OF THE EMBODIMENT

An embodiment described below is used to facilitate understanding of the present invention and those skilled in the art should note that the present invention is not unduly limited by the embodiment described below.

FIG. 1 is a diagram illustrating an arrangement of a first virtual image display surface 100 and a second virtual image display surface 200 generated by a head-up display (hereinafter, also referred to as HUD) 1 of the embodiment and is a diagram seen from the side outside of a vehicle 2 in which the HUD 1 is mounted.

As illustrated in FIG. 1, the HUD 1 of the present invention is mounted in the vehicle 2 and generates the first virtual image display surface 100 capable of displaying a first virtual image V1 thereon and the second virtual image display surface 200 that is located more closely to the viewer (for example, a driver of the vehicle 2) than the first virtual image display surface 100 and capable of displaying a second virtual image V2 thereon. It is noted that the first virtual image display surface 100 and the second virtual image display surface 200 merely indicate a region in which the first virtual image V1 and the second virtual image V2 can be displayed, and are not visible to the viewer as an image.

As illustrated in FIG. 1, the first virtual image display surface 100 of the present embodiment is a surface inclined in a depth direction (typically, toward the front of the vehicle 2) seen from the viewer. Specifically, the first virtual image display surface 100 is arranged inclinedly so that an upper end is farther from the viewer than a lower end.

Further, as illustrated in FIG. 2, seen from the viewer, the first virtual image display surface 100 has a rectangular shape and is arranged separately from the second virtual image display surface 200 at an upper side in the vertical direction of the second virtual image display surface 200.

As illustrated in FIG. 1, the second virtual image display surface 200 of the present embodiment is further elevated towards the viewer than the first virtual image display surface 100.

Further, as illustrated in FIG. 2, seen from the viewer, the second virtual image display surface 200 has a rectangular shape smaller than the first virtual image display surface 100 and is arranged separately from the first virtual image display surface 100 at a lower side in the vertical direction of the second virtual image display surface 200.

That is, in the vehicle 2 on a road (a lane L) without gradient, an angle θ1 formed by a surface opposite of the viewer side of the first virtual image display surface 100 and the lane L (for example, the horizontal direction) is set smaller than an angle θ2 formed by a surface opposite of the viewer side of the second virtual image display surface 200 and the lane L (for example, the horizontal direction). The angle θ1 is from 0 to 45 degrees, specifically, is set to 20 degrees, for example. Further, the angle θ2 is from 80 to 90 degrees, specifically, is set to 83 degrees, for example.

Note that the shape of the first virtual image display surface 100 or the second virtual image display surface 200 seen from the viewer is not limited to the rectangular shape mentioned above. The first virtual image display surface 100 or the second virtual image display surface 200 seen from the viewer may be of a shape such as a trapezoid, polygonal, or elliptical shape. Further, the arrangement of the first virtual image display surface 100 and the second virtual image display surface 200 may be reversed.

FIG. 3 is a diagram illustrating an example of a configuration of the HUD 1 of the present embodiment.

As illustrated in FIG. 3(a), the HUD 1 of the present embodiment is mainly constituted by an image display unit 10 configured to display an image, a projection unit 20 configured to project a display light M from the image display unit 10 towards the outside of the HUD 1, and a display control unit 40 described later.

The image display unit 10 includes a first display surface 11 configured to display a non-illustrated first image and a second display surface 12 configured to display a non-illustrated second image. The first display surface 11 corresponds to the first virtual image display surface 100 and the first image displayed on the first display surface 11 is visible on the first virtual image display surface 100 as the first virtual image V1. Further, the second display surface 12 corresponds to the second virtual image display surface 200 and the second image displayed on the second display surface 12 is visible on the second virtual image display surface 200 as the second virtual image V2. It is noted that, originally, countless rays of display light based on images are emitted from the first display surface 11 and the second display surface 12, however, in the drawings used for the description of the present embodiment, only the optical axis of the light beam of the display light heading from the first display surface 11 to the viewer is illustrated as a first display light M1 and only the optical axis of the light beam of the display light heading from the second display surface 12 to the viewer is illustrated as a second display light M2.

The image display unit 10 is constituted by, for example, a projection-type display device using a reflection-type display device such as DMD or LCoS. In this case, the first display surface 11 and the second display surface 12 are constituted by a screen or the like configured to display projection light emitted from the projection-type display device, as an actual image. It is noted that the image display unit 10 may include a plurality of projection-type display devices: a projection-type display device configured to display the first image on the first display surface 11 and a projection-type display device configured to display the second image on the second display surface 12; or may have a configuration in which some of the projection light from a single projection-type display device is imaged on the first display surface 11 and the other of the projection light is imaged on the second display surface 12.

The first display surface 11 is arranged at a position farther from the projection unit 20 than the second display surface 12, so that an optical path of the first display light M1 heading from the first display surface 11 to the viewer is longer than an optical path of the second display light M2 heading from the second display surface 12 to the viewer. Thus, the first virtual image display surface 100 corresponding to the first display surface 11 is generated at a position farther from the viewer than the second virtual image display surface 200 corresponding to the second display surface 12. It is noted that by returning the first display light M1 by a plurality of reflection parts or the like not illustrated, the optical path of the first display light M1 heading from the first display surface 11 to the viewer may be lengthened.

Further, the first display surface 11 and the second display surface 12 are arranged at different setting angles within the HUD 1. Thus, the angles at which the first virtual image display surface 100 and the second virtual image display surface 200 are generated, can be set different.

It is noted that, also in a case other than the above-described embodiment, as illustrated in FIG. 3(b), the HUD 1 that generates the first virtual image display surface 100 and the second virtual image display surface 200 may include, in addition to the above-described first display surface 11, the second display surface 12, and the projection unit 20, an image synthesis unit 30. The image synthesis unit 30 illustrated in FIG. 3(b) includes a transmission-reflection portion or the like such as a half mirror or a dichroic mirror, and is configured to direct the first display light M1 and the second display light M2 to the viewer side by transmitting the first display light M1 from the first display surface 11 and reflecting the second display light M2 from the second display surface 12. Thus, the first virtual image display surface 100 and the second virtual image display surface 200 can be generated as described above, also by the HUD 1 in FIG. 3(b).

FIG. 4 is a diagram illustrating an electrical configuration of the HUD 1 of the present embodiment.

The display control unit 40 of the present embodiment acquires parameter information P such as later-described peripheral information P1, position information P2, vehicle information P3, or driver information P4, and based on the acquired parameter information P, controls a visibility level Q of the first virtual image V1 and a visibility level Q of the second virtual image V2.

A peripheral detection unit 4 is configured to detect a distance to a predetermined subject present in the periphery of the vehicle 2 (such as a vehicle, an obstacle, or a white line on the driving lane, present in the periphery of the vehicle 2), a relative speed between the vehicle 2 and the subject, and the like, and includes, for example, a camera such as a stereo camera, a monocular camera, and a monocular three-dimensional stereo camera arranged in the vehicle 2 and configured to image visible light, a sensor such as an infrared sensor, a millimeter-wave radar, and a laser radar, and the like. The peripheral detection unit 4 transmits, to the display control unit 40 of the HUD 1, via a communication bus 3 such as a CAN arranged in the vehicle 2, the peripheral information P1 including the detected distance to the subject, the relative speed relative to the subject, and the like.

A position detection unit 5 utilizes a well-known GPS to acquire position information such as position information of the vehicle 2 and an intersection in the vicinity, is constituted by a navigation system and the like, and, if entering a destination, may be capable of setting a route and performing guidance to the destination. The position detection unit 5 transmits, to the display control unit 40 of the HUD 1, via the communication bus 3, the position information P2 indicating, as a numerical value or a plurality of graded levels, a position of the vehicle 2, a distance to or a time required to reach an intersection in the vicinity, a distance to or a time required to reach a destination, or the like.

A vehicle state detection unit 6 is configured to acquire a speed of the vehicle 2, information detected by various types of sensors of the vehicle 2, and the like, and is constituted by an ECU and the like provided in the vehicle 2, for example. The vehicle state detection unit 6 transmits, to the display control unit 40 of the HUD 1, via the communication bus 3, the speed of the vehicle 2 or the vehicle information P3 indicated as a numerical value or a plurality of graded levels detected by the various types of sensors of the vehicle 2.

A driver state detection unit 7 is configured to detect a degree of doze, looking-aside (degree of distraction of the line of sight) or the like of the driver of the vehicle 2 and includes a driver monitor system including one or more cameras for imaging the driver, various types of sensors, and the like. The driver state detection unit 7 transmits, to the display control unit 40 of the HUD 1, via the communication bus 3, the driver information P4 in which the degree of doze, looking-aside (the degree of distraction of the line of sight) or the like of the driver is indicated as a numerical value or classified into a plurality of graded levels.

The display control unit 40 includes, for example, a processing unit 41 and a storage unit 42. The processing unit 41 is constituted by a CPU, for example, and the storage unit 42 is constituted by a ROM, for example. The display control unit 40 is connected to the communication bus 3 via an interface (also referred to as I/F) 50. It is noted that the interface 50 includes an input-output communication interface to be connected to the communication bus 3 and is configured to acquire, via the communication bus 3, the parameter information P indicated as a numerical value or a plurality of graded levels of the peripheral information P1, the position information P2, the vehicle information P3, the driver information P4, or the like. It is noted that the interface 50 may be included in the display control unit 40. The interface 50 of the present embodiment has a function as a parameter information acquisition means for acquiring the parameter information P indicated as a predetermined numerical value or a plurality of graded levels in the present invention. Further, the storage unit 42 is configured to store in advance first visibility control data C1 for adjusting the visibility level Q of the first virtual image V1 based on the input parameter information P, and second visibility control data C2 for adjusting the visibility level Q of the second virtual image V2 based on the input parameter information P. It is noted that examples of the first visibility control data C1 and the second visibility control data C2 will be described later. The display control unit 40 may be arranged within the HUD 100 and some or all functions thereof may be arranged on the vehicle side outside of the HUD 100.

FIG. 5 is a diagram for describing an example of a relationship between the first visibility control data C1 for changing the visibility level Q of the first virtual image V1 based on the parameter information P and the second visibility control data C2 for changing the visibility level Q of the second virtual image V2 based on the parameter information P. The horizontal axis indicates the parameter information P and the vertical axis indicates the visibility level Q.

The first visibility control data C1 and the second visibility control data C2 of the present invention are data for changing continuously or stepwise, each of the visibility level Q of the first virtual image V1 and the visibility level Q of the second virtual image V2 based on the numerical value or the level of the common parameter information P, and gradually change (increase or decrease) the relative ratio between the visibility level Q of the first virtual image V1 and the visibility level Q of the second virtual image V2, based on the change of the parameter information P.

In an example shown in FIG. 5(a), the first visibility control data C1 keeps the visibility level Q of the first virtual image V1 constant at Q1 until the parameter information P reaches predetermined parameter information Pa. If the parameter information P is equal to or greater than the predetermined parameter information Pa, the first visibility control data C1 continuously decreases the visibility level Q of the first virtual image V1, based on the change of the parameter information P. Further, the second visibility control data C2 keeps the visibility level Q constant at a visibility level Q2 (different from the visibility level Q1) that is higher than the visibility level Q1, until the parameter information P reaches predetermined parameter information Pa. If the parameter information P is equal to or greater than the predetermined parameter information Pa, the second visibility control data C2 continuously increases the visibility level Q of the first virtual image V1, based on the change of the parameter information P. That is, if reading, from the storage unit 42, the first visibility control data C1 and the second visibility control data C2 shown in FIG. 5(a), upon the parameter information P being equal to or greater than Pa, the processing unit 41 gradually increases, at a constant changing rate, the relative ratio between the visibility level Q of the first virtual image V1 and the visibility level Q of the second virtual image V2, in accordance with the increase of the parameter information P input from the interface 50.

In an example shown in FIG. 5 (b), the processing unit 41 reads, from the storage unit 42, the first visibility control data C1 and the second visibility control data C2, keeps the visibility level Q of the first virtual image V1 and the visibility level Q of the second virtual image V2 at substantially the same visibility level Q1 until the parameter information P reaches the predetermined parameter information Pa, and upon the parameter information P being equal to or greater than Pa, decreases, at a constant changing rate, the visibility level Q of the first virtual image V1 and increases, at a constant changing rate, the visibility level Q of the second virtual image V2, in accordance with the increase of the parameter information P input from the interface 50. Thus, in accordance with the increase of the parameter information P, the processing unit 41 can gradually increase, at a constant changing rate, the relative ratio between the visibility level Q of the first virtual image V1 and the visibility level Q of the second virtual image V2.

In an example shown in FIG. 5(c), the processing unit 41 reads, from the storage unit 42, the first visibility control data C1, keeps the visibility level Q of the first virtual image V1 at the visibility level Q1 until the parameter information P reaches the predetermined parameter information Pa, and upon the parameter information P being equal to or greater than Pa, decreases, at a constant changing rate, the visibility level Q of the first virtual image V1, in accordance with the increase of the parameter information P input from the interface 50. The processing unit 41 reads, from the storage unit 42, the second visibility control data C2 shown in FIG. 5(c), keeps the visibility level Q of the second virtual image V2 at the predetermined visibility level Q2 until the parameter information P reaches parameter information Pb larger than the parameter information Pa, and upon the parameter information P being equal to or greater than Pb, increases, at a constant changing rate, the visibility level Q of the second virtual image V2, in accordance with the increase of the parameter information P input from the interface 50. Thus, in accordance with the increase of the parameter information P, the processing unit 41 can gradually increase, at a constant changing rate, the relative ratio between the visibility level Q of the first virtual image V1 and the visibility level Q of the second virtual image V2.

In accordance with the change of the parameter information P, one of the first visibility control data C1 and the second visibility control data C2 shown in the above-described FIG. 5(a), FIG. 5(b), and FIG. 5(c) increases and the other thereof decreases, however, as shown in FIG. 5(d), both the first visibility control data C1 and the second visibility control data C2 may decrease the visibility level Q in accordance with the increase of the Parameter information P. It is noted that, in this case, the changing rate of the visibility level Q for the parameter information P in the first visibility control data C1 is different from the changing rate of the visibility level Q for the parameter information P in the second visibility control data C2. Thus, in accordance with the increase of the parameter information P, the processing unit 41 can gradually increase, at a constant changing rate, the relative ratio between the visibility level Q of the first virtual image V1 and the visibility level Q of the second virtual image V2.

Further, as shown in FIG. 5(e), the first visibility control data C1 and/or the second visibility control data C2 may change stepwise the visibility level Q in accordance with the change of the parameter information P.

Further, as shown in FIG. 5W, the first visibility control data C1 and the second visibility control data C2 may reverse the visibility level Q of the first virtual image V1 and the visibility level Q of the second virtual image V2, with the predetermined parameter information Pa as a boundary. Specifically, if the parameter information P is less than the parameter information Pa, the visibility of the first virtual image V1 is high, the first visibility control data C1 decreases the visibility level Q of the first virtual image V1 in accordance with the increase of the parameter information P, and the second visibility control data C2 increases the visibility level Q of the second virtual image V2 in accordance with the increase of the parameter information P, and if the parameter information P is equal to or greater than the parameter information Pa, the visibility of the second virtual image V2 is high.

Further, the first visibility control data C1 or the second visibility control data C2 may decrease, in accordance with the change of the parameter information P, the visibility level Q to zero, that is, to a level not visible to the viewer. The processing unit 41 reads, from the storage unit 42, the second visibility control data C2 shown in FIG. 5(g) and may decrease, in accordance with the increase of the parameter information P, the visibility level Q of the second virtual image V2 at a constant changing rate until reaching zero. Further, the processing unit 41 reads, from the storage unit 42, the second visibility control data C2 shown in FIG. 5(h), decreases, at a constant changing rate, the visibility level Q of the second virtual image V2 in accordance with the increase of the parameter information P, and when reaching the predetermined parameter information Pa, may abruptly set the visibility level Q of the second virtual image V2 to zero.

It is noted that, as illustrated in FIG. 2, in the HUD 1 of the above-described embodiment, seen from the viewer, the first virtual image display surface 100 and the second virtual image display surface 200 are arranged separated from each other, however, as illustrated in FIG. 6, in the HUD 1 of the present invention, the first virtual image display surface 100 and the second virtual image display surface 200 may be arranged to partly overlap. In such a case, a region to which the first visibility control data C1 for changing the above-described visibility level Q is applied, may only be, within the first virtual image display surface 100, a first overlapping region 110 overlapping with the second virtual image display surface 200. Similarly, a region to which the second visibility control data C2 for changing the visibility level Q is applied, may only be, within the second virtual image display surface 200, a second overlapping region 210 overlapping with the first virtual image display surface 100. Thus, in a region other than the first overlapping region 110 (the second overlapping region 210) of the first virtual image display surface 100 (the second virtual image display surface 200), a constant visibility is ensured without performing change in accordance with the parameter information P, while in the first overlapping region 110 (the second overlapping region 210) in which the first virtual image display surface 100 and the second virtual image display surface 200 overlap, information conform to the parameter information P can be presented with a desired visibility to the viewer.

Next, an operation and effect of the present invention will be described.

The HUD 1 of the present invention is a head-up display configured to display the first virtual image V1 on the first virtual image display surface 100 and display the second virtual image V2 on the second virtual image display surface 200 generated more closely to the viewer than the first virtual image display surface 100. The head-up display includes: the parameter information acquisition means 50 configured to acquire the parameter information P indicated as a numerical value or a plurality of graded levels; and the display control unit 40 configured to control the display of the first virtual image V1 and the second virtual image V2. The display control unit 40 is configured to change continuously or stepwise the visibility of the first virtual image V1 and the visibility of the second virtual image V2, in accordance with a numerical value or a level of the parameter information P acquired by the parameter information acquisition means 50. A changing rate of the visibility of the first virtual image V1 for the parameter information P is set different from a changing rate of the visibility of the second virtual image V2. Thus, the visibility of the first virtual image V1 and the second virtual image V2 do not change uniformly in accordance with the parameter information P, and therefore, the awareness of the viewer can be directed to a relatively specific display or actual view.

Further, in the HUD 1 of the present invention, the display control unit 40 may increase one of the visibility of the first virtual image V1 and the visibility of the second virtual image V2, in accordance with the change of the parameter information P, and decrease the other in accordance with the change of the parameter information P. This makes distraction of the attention less likely by reducing the visibility of one virtual image and enables focusing the awareness of the viewer on the other virtual image in which the visibility increases based on the parameter information P.

Further, in the HUD 1 of the present invention, the display control unit 40 may change the visibility of the first virtual image V1 and the visibility of the second virtual image V2 so that the difference between the visibility of the first virtual image V1 and the visibility of the second virtual image V2 has a constant increase rate or decrease rate for the parameter information P. Thus, the difference between the visibility of the first virtual image V1 and the visibility of the second virtual image V2 is changed at a constant increase rate or decrease rate in accordance with the change of the parameter information P, and therefore, the size of the parameter information P can be presumed based on the change in the difference of the visibility between the first virtual image V1 and the second virtual image V2.

Further, in the HUD 1 of the present invention, the display control unit 40 may perform visibility adjustment in accordance with the parameter information P, only if a first specific virtual image V1 and/or a second specific virtual image V2 is displayed. Thus, visibility adjustment of the first virtual image V1 and the second virtual image V2 in accordance with the parameter information P will not be performed frequently. Furthermore, visibility adjustment is performed only if a specific virtual image is displayed, and thus, it is possible to impress the viewer more strongly with the change in visibility.

Further, in the HUD 1 of the present invention, if, after there is a gradual change that the parameter information P either increases or decreases, the parameter information P gradually changes otherwise, the display control unit 40 may gradually change the visibility of the first virtual image V1 and/or the visibility of the second virtual image V2 until a predetermined level in accordance with the elapsed time. Specifically, for example, the display control unit 40 gradually changes (increases or decreases) the relative ratio between the visibility level Q of the first virtual image V1 and the visibility level Q of the second virtual image V2, based on the increase of the parameter information P and subsequently, when the parameter information P decreases, gradually changes the visibility level Q in accordance with the elapsed time towards the initial visibility level Q1 (Q2) before changing the visibility level Q of the first virtual image V1 and the visibility level Q of the second virtual image V2. That is, in the change that the parameter information P either increases or decreases, the visibility is changed in accordance with the change of the parameter information P, based on the first visibility control data C1 and the second visibility control data C2, however, in the other change of the parameter information P, the visibility is not changed based on the first visibility control data C1 and the second visibility control data C2 but is changed in accordance with the elapsed time. Thus, the first visibility control data C1 and the second visibility control data C2 for changing the visibility level Q in accordance with the parameter information P are applied in the change of the parameter information P in one direction, and are not applied but the visibility is changed in accordance with the time in the change in the other direction, and thus, it is possible to make the viewer presume that a duration needing attention, during which the change of the parameter information P is shifted in the opposite direction, has elapsed.

Further, in the HUD 1 of the present invention, if the parameter information P is either equal to or greater than a certain value, or equal to or less than the value, the display control unit 40 may change the visibility of the first virtual image V1 and/or the visibility of the second virtual image V2 in accordance with the parameter information P, and then, if the parameter information P is changed otherwise, that is, either equal to or greater than the certain value, or equal to or less than the value, gradually change the visibility of the first virtual image V1 and/or the visibility of the second virtual image V2 until the predetermined level in accordance with the elapsed time. Specifically, for example, if the parameter information P is equal to or greater than the certain value, after gradually changing (increasing or decreasing) the relative ratio between the visibility level Q of the first virtual image V1 and the visibility level Q of the second virtual image V2, based on the change of the parameter information P, the display control unit 40 gradually changes the visibility level Q of the first virtual image V1 and the visibility level Q of the second virtual image V2 in accordance with the elapsed time towards the initial visibility level Q1 (Q2), if the parameter information P is less than the certain value. That is, if the parameter information P is either equal to or greater than the certain value, or equal to or less than the value, the visibility is changed in accordance with the change of the parameter information P, based on the first visibility control data C1 and the second visibility control data C2, however, if the parameter information P reaches either equal to or greater than the certain value, or equal to or less than the value, the visibility is not changed based on the first visibility control data C1 and the second visibility control data C2 but is changed in accordance with the elapsed time. Thus, it is possible to make the viewer presume in which region the parameter information P is present. Further, it is possible to make the viewer presume that the parameter information P is no longer in a region needing attention.

Further, in the HUD 1 of the present invention, the first virtual image display surface 100 and the second virtual image display surface 200 are arranged to overlap at least partly seen from the viewer, and the display control unit 40 may, in accordance with the parameter information P, change the visibility of the first virtual image V1 displayed in the region of the first virtual image display surface 100 overlapping with the second virtual image display surface 200 and the visibility of the second virtual image V2 displayed in the region of the second virtual image display surface 200 overlapping with the first virtual image display surface 100.

Further, the HUD 1 of the present invention may further include an illuminance sensor (illuminance information acquisition means) 60 configured to acquire illuminance information about a peripheral illuminance and if determining, based on the illuminance information from the illuminance sensor 60, that the illuminance is low, the display control unit 40 may set the changing rate of the visibility level Q of the first virtual image V1 and/or the changing rate of the visibility level Q of the second virtual image V2 for the parameter information P lower than in a case where the illuminance is high. That is, if the illuminance is low, the changing rate (gradient) of the first visibility control data C1 and/or the second visibility control data C2 for the parameter information P shown in FIG. 5 is set smaller. Thus, in a dark environment such as night, the visibility of the first virtual image V1 and the second virtual image V2 is changed more gently than in a bright environment such as daytime, and thus, it is possible to appropriately adjust, even in the dark environment in which a viewer is more sensitive to a change in luminance, a balance between the visibility of the actual view and the visibility of the first virtual image V1 and the second virtual image V2.

Further, in the HUD 1 of the present invention, if determining, based on the illuminance information from the illuminance sensor 60, that the illuminance is low, the display control unit 40 may set a change starting point of the visibility level Q of the first virtual image V1 and/or the visibility level Q of the second virtual image V2 for the parameter information P earlier than in the case where the illuminance is high. Specifically, for example, if changing, as shown in FIG. 5($a$), the visibility of the first virtual image V1 and the second virtual image V2 based on the first visibility control data C1 and the second visibility control data C2, when the illuminance is high, the display control unit 40 shifts the predetermined parameter information Pa for changing the visibility level Q of the first virtual image V1 and the visibility level Q of the second virtual image V2 to a lower side, if the illuminance is low. As a result, in the dark environment such as night, the visibility of the virtual image starts to change earlier than in the bright environment such as daytime, and thus, the attention of the viewer can be early directed to a desired virtual image.

Modifications

Now a modification of the embodiment of the present invention is described.

In the embodiment described above, the parameter information acquisition means of the present invention is the interface 50 configured to acquire the parameter information P from outside, however, the parameter information acquisition means may be constituted by various types of sensors configured to acquire the parameter information P. Specifically, for example, the parameter information acquisition means may be constituted by the peripheral detection unit 4, the position detection unit 5, the vehicle state detection unit 6, and the driver state detection unit 7 described above.

It is noted that, in the embodiment described above, the angle θ1 formed by the first virtual image display surface 100 and the lane L and the angle θ2 formed by the second virtual image display surface 200 and the lane L are different, but these angles may be substantially the same.

Further, the configuration of the HUD 1 configured to generate the first virtual image display surface 100 capable of displaying the first virtual image V1 thereon and the second virtual image display surface 200 located more closely to the viewer than the first virtual image display surface 100 and capable of displaying the second virtual image V2 on a surface with a larger slope in the horizontal direction than the first virtual image display surface 100, is not limited to the that illustrated in FIG. 3($a$) and FIG. 3($b$), but a configuration of a known HUD capable of generating a plurality of virtual image display surfaces may be applied.

Further, the first virtual image display surface 100 and the second virtual image display surface 200 according to the embodiment described above are flat surfaces, however, they may be curved surfaces. Further, three or more virtual image display surfaces may be generated.

Further, in the embodiment described above, the illuminance information acquisition means of the present invention is an illuminance sensor configured to acquire the illuminance information, however, a configuration may be so that an illuminance sensor is arranged in the vehicle 2 and the interface 50 acquires the illuminance information from the vehicle 2 via the communication bus 3. Further, the illuminance information input from the interface 50 may not only be information about the illuminance, but may be a light control value determined by the ECU of the vehicle 2. If the light control value is low, it is possible to presume that the illuminance is low. Further, the illuminance information may be information about an on/off state of a light of the vehicle 2. If the information about the light is in the on state, it is possible to presume that the illuminance is low.

INDUSTRIAL APPLICABILITY

Application is possible as a head-up display device mounted in a moving body, such as a vehicle.

REFERENCE SIGNS LIST

1 . . . HUD (head-up display), 2 . . . vehicle, 3 . . . communication bus, 4 . . . peripheral detection unit (parameter information acquisition means), 5 . . . position detection unit (parameter information acquisition means), 6 . . . vehicle state detection unit (parameter information acquisition means), 7 . . . driver state detection unit (parameter information acquisition means), 10 . . . image display unit, 11 . . . first display surface, 12 . . . second display surface, 20 . . . projection unit, 30 . . . image synthesis unit, 40 . . . display control unit, 50 . . . interface (parameter information acquisition means), 100 . . . first virtual image display surface, 200 . . . second virtual image display surface, P . . . parameter information, V1 . . . first virtual image, V2 . . . second virtual image

The invention claimed is:

1. A head-up display configured to display a first virtual image on a first virtual image display surface and display a second virtual image on a second virtual image display surface generated closer to a viewer than the first virtual image display surface, the head-up display comprising:
a parameter information acquisition means configured to acquire predetermined parameter information indicated as a numerical value or a plurality of graded levels;
a display control unit configured to control a display of the first virtual image and the second virtual image; and
an illuminance information acquisition means configured to acquire illuminance information about a peripheral illuminance, wherein
the display control unit changes continuously or stepwise a visibility of the first virtual image and a visibility of the second virtual image, in accordance with a numerical value or a level of the parameter information acquired by the parameter information acquisition means, a changing rate of the visibility of the first virtual image for the parameter information is different from a changing rate of the visibility of the second virtual image, and when determining that the illuminance is low based on the illuminance information from the illuminance information acquisition means, the display control unit sets:
  1) the changing rate of the visibility of the first virtual image, 2) the changing rate of the visibility of the second virtual image, or 3) both the changing rate of the visibility of the first virtual image and the changing rate of the visibility of the second virtual image for the parameter information to be lower than in a case where the illuminance is high; or
  1) a change starting point of the visibility of the first virtual image, 2) a change starting point of the visibility of the second virtual image, or 3) both the change starting point of the visibility of the first virtual image and the change starting point of the visibility of the second virtual image for the parameter information to be earlier than in a case where the illuminance is high.

2. The head-up display according to claim 1, wherein the display control unit increases one of the visibility of the first virtual image and the visibility of the second virtual image in accordance with a change of the parameter information, and decreases the other in accordance with the change of the parameter information.

3. The head-up display according to claim 1, wherein the display control unit changes the visibility of the first virtual image and the visibility of the second virtual image so that the difference between the visibility of the first virtual image and the visibility of the second virtual image has a constant increase rate or decrease rate for the parameter information.

4. The head-up display according to claim 1, wherein the display control unit performs visibility adjustment in accordance with the parameter information, only if 1) a specific type of the first virtual image, 2) a specific type of the second virtual image, or 3) both the specific type of the first virtual image and the specific type of the second virtual image are displayed.

5. The head-up display according to claim 1, wherein the display control unit gradually changes 1) the visibility of the first virtual image and/or, 2) the visibility of the second virtual image, or 3) both the visibility of the first virtual image and the visibility of the second virtual image until a predetermined level in accordance with an elapsed time, if, after there is a gradual change that the parameter information either increases or decreases, the parameter information gradually changes otherwise.

6. The head-up display according to claim 1, wherein
  the first virtual image display surface and the second virtual image display surface are arranged to overlap at least partly seen from the viewer, and
  the display control unit changes, in accordance with the parameter information, the visibility of the first virtual image displayed in a region of the first virtual image display surface overlapping with the second virtual image display surface and the visibility of the second virtual image displayed in a region of the second virtual image display surface overlapping with the first virtual image display surface.

* * * * *